Sept. 25, 1956  B. A. ANDERSSON  2,764,448
COLLAPSIBLE LUGGAGE CARRIER FOR VEHICLES
Filed April 27, 1953  4 Sheets-Sheet 3
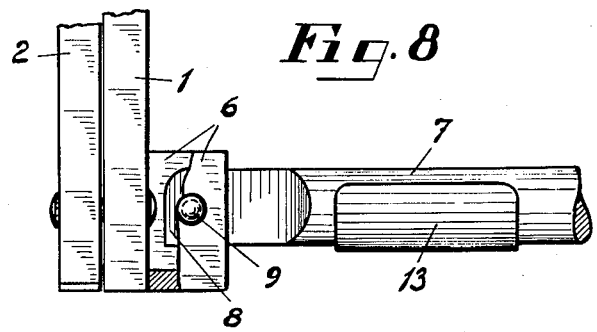
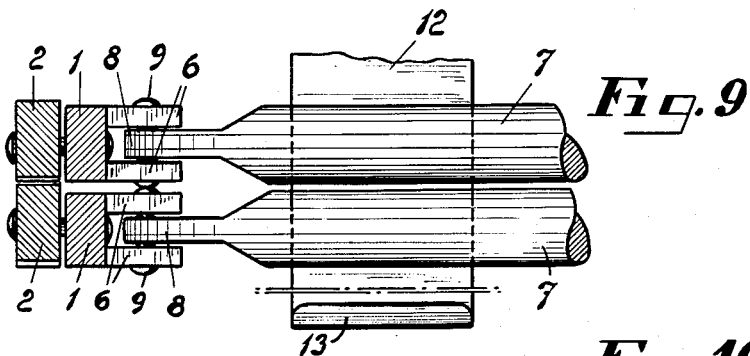
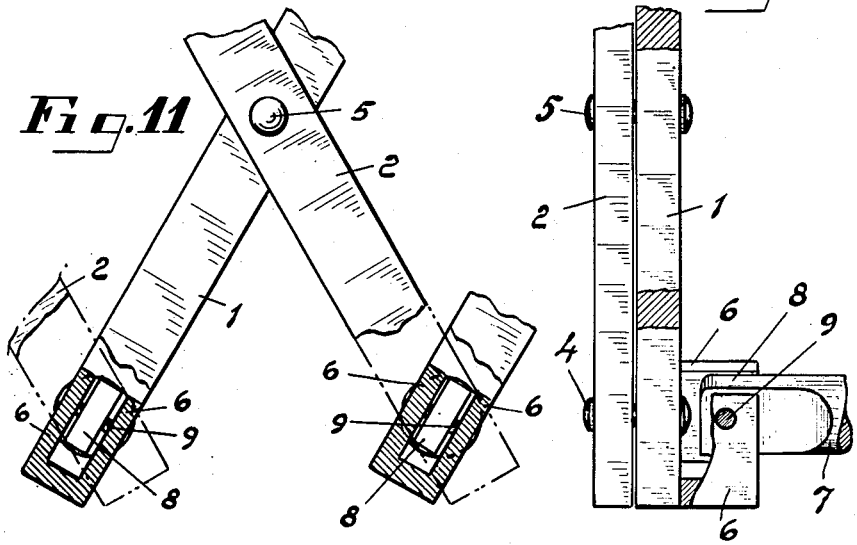
INVENTOR
BROR ADOLF ANDERSSON
By Linton and Linton
ATTORNEYS Sept. 25, 1956  B. A. ANDERSSON  2,764,448
COLLAPSIBLE LUGGAGE CARRIER FOR VEHICLES
Filed April 27, 1953  4 Sheets-Sheet 4
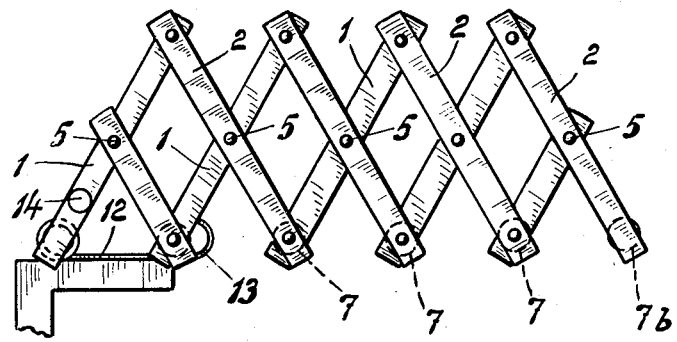
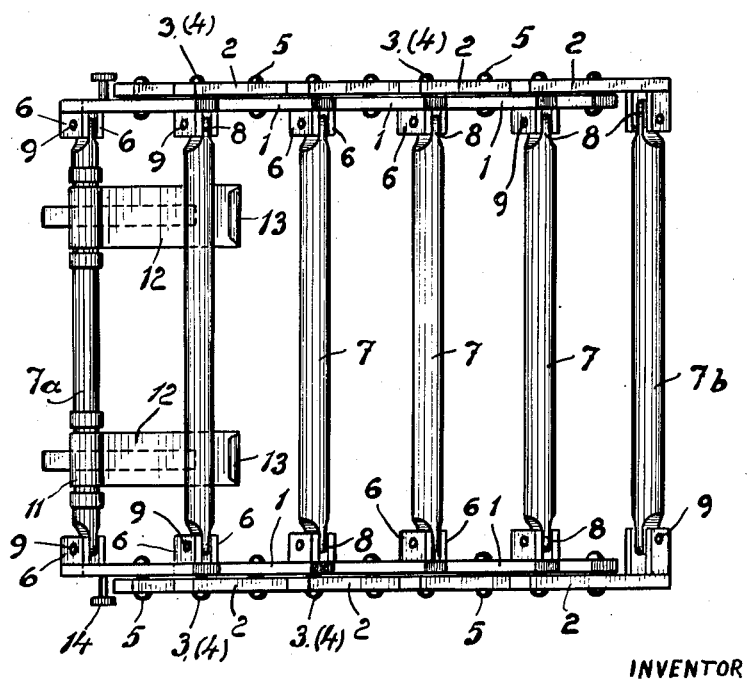
INVENTOR
BROR ADOLF ANDERSSON
By Linton and Linton
ATTORNEYS

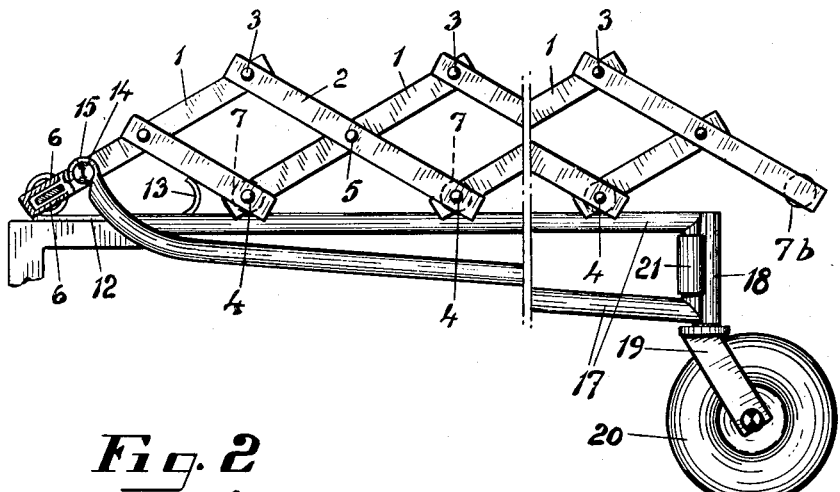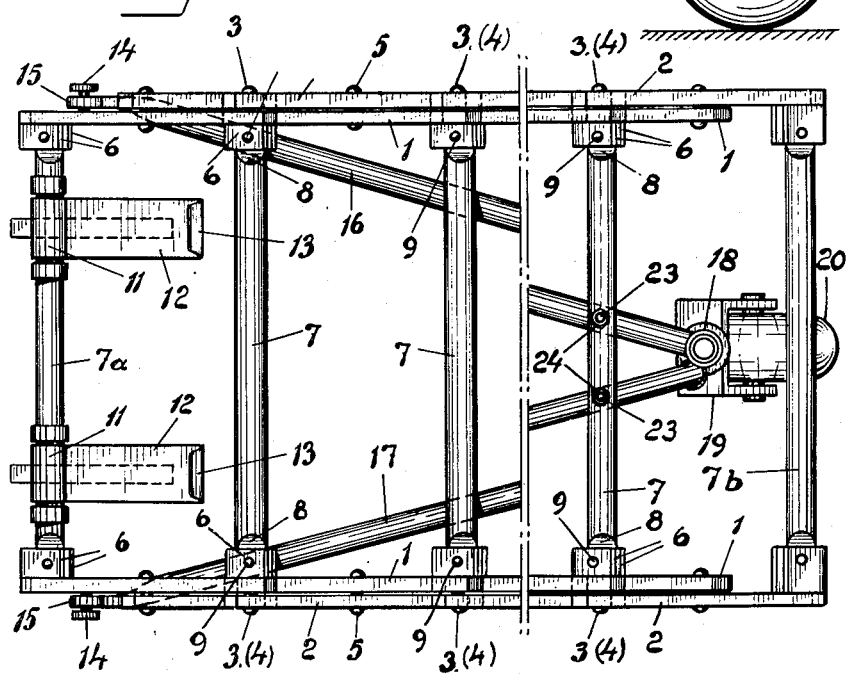

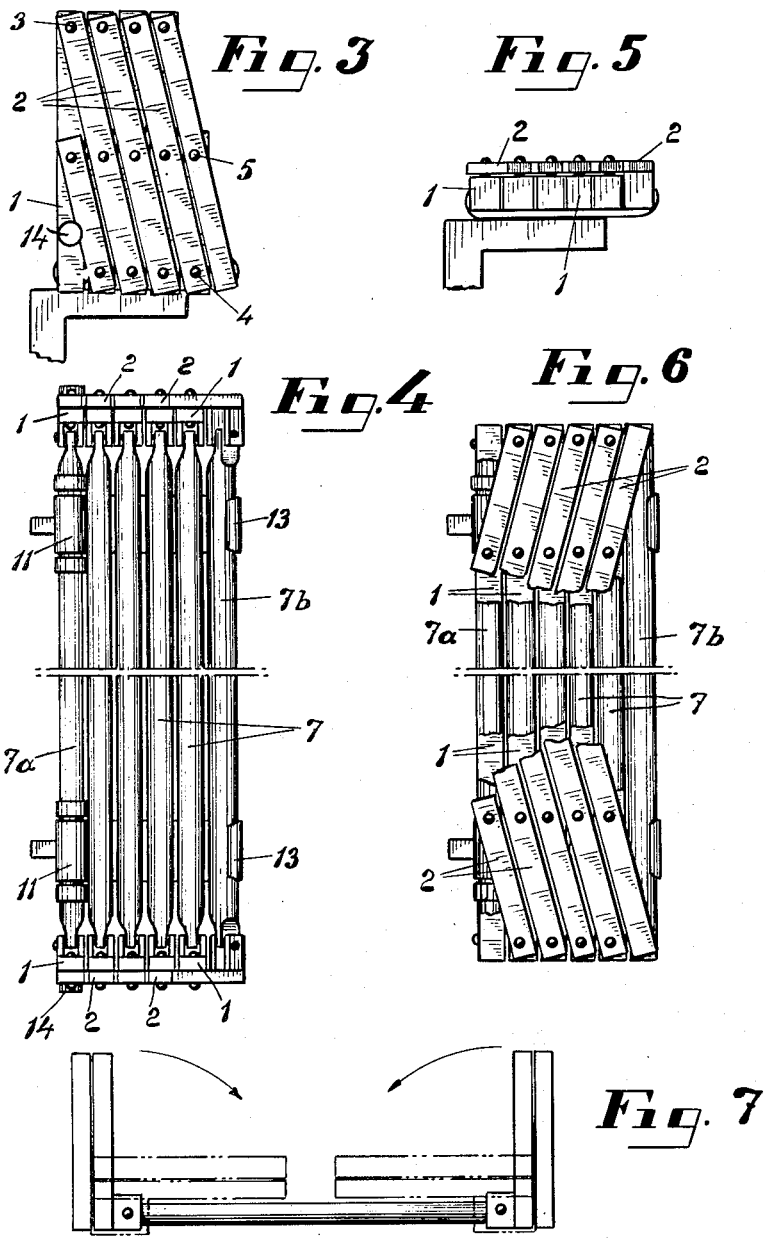

United States Patent Office 2,764,448
Patented Sept. 25, 1956

2,764,448

COLLAPSIBLE LUGGAGE CARRIER FOR VEHICLES

Bror Adolf Andersson, Boras, Sweden

Application April 27, 1953, Serial No. 351,361

3 Claims. (Cl. 296—27)

The present invention relates to a collapsible luggage holder of the type intended for motor vehicles, which consists on the one hand of two equal and parallel side supports and on the other hand of a number of transverse rods which connect the two side supports, are positioned in one and the same horizontal plane parallel to one another and are intended to support the luggage. Each side support is composed of two series of intersecting bars which are pivotally connected with one another at the points of intersection in a lazy-tongs manner. Such a luggage holder is adapted to be pulled out from the collapsed position of the side supports in which the transverse rods are disposed adjacent one another to a position ready for use in which the transverse rods are located at a distance from one another.

The invention is particularly concerned with luggage holders of the type set forth in which the transverse rods are connected at their ends with the bars of one series of bars of each side support by means of pivot pins which, in the collapsed position of the luggage holder, are arranged horizontally and coaxially relatively to each side support, so that in the collapsed position of the luggage holder, the side supports are capable of being swung downwardly over the transverse rods.

The invention is essentially characterised by the fact that the pivot pins are mounted in lugs rigidly connected with the bars, so that in the extended position of the luggage holder, the pivot pins assume an inclined position in relation to the horizontal plane in order to be able to hinge down the side supports in the extended position and also in order to prevent an extension of the luggage holder when the side supports are in the downwardly hinged position.

One constructional example of the invention is illustrated in the accompanying drawings, wherein Figures 1 and 2 are respectively a side elevation and plan view of a luggage holder constructed in accordance with the invention in the ready-for-use position, supported by a frame provided with a supporting wheel;

Figures 3 and 4 are similar views of the luggage holder in the collapsed position;

Figures 5 and 6 are corresponding views with the side supports hinged down;

Figure 7 is an end view of the luggage holder in the collapsed position;

Figure 8 is a view to a larger scale, partly in section, of the articulated connection between a transverse rod and one of the side supports in the collapsed position of the luggage holder, seen in the direction of the arrow in Figure 4;

Figure 9 shows the articulated connection as seen from above;

Figure 10 is a view corresponding to Figure 8 with the luggage holder in a slightly extended position;

Figure 11 is a side elevation, partly in section, of a support on one side in the extended position;

Figures 12 and 13 are views corresponding to Figures 1 and 2 in the ready-for-use position, in which it is not supported by the frame.

As already explained above, the luggage holder comprises two side supports in the form of two lazy-tongs disposed parallel to one another and a number of transverse rods connecting the latter and disposed in the same horizontal plane. Each side support is built up of two series of bars 1 and 2, the bars 1 of equal length and extending parallel to one another in one series intersecting the equal-length and relatively parallel bars 2 of the other series. The bars 1 and 2 are pivotally connected with one another at the ends and at the middle by means of pins 3, 4 and 5 so that the side supports can be drawn out or pushed together in known manner. Secured at one end, i. e. the bottom end, of each of the rods 1 are two lugs 6 which are disposed at a distance from one another and are so arranged that the lugs of one side support project in a direction towards the corresponding lugs of the other side support. Introduced between opposed pairs of lugs by means of their flattened end portions 8 are the transverse rods 7, these being pivotally connected to the lugs by means of pivot pins 9. These pins 9 are so arranged that in the collapsed position of the side supports (Figures 3, 4, 8 and 9), in which position the bars 1 are disposed perpendicular to the plane in which the transverse rods now disposed adjacent one another are located, the pins 9 in each side support are coaxial with one another and parallel to the plane in which the transverse bars are lying. In this collapsed position of the luggage holder, the side supports can be hinged down over the transverse bars 7 (Figures 5 and 6) so that the luggage holder cannot be pulled out or extended if the side supports are not first hinged up into the position shown in Figures 3 and 4 and in full lines in Figure 7. In accordance with the embodiment illustrated, one of the two outermost transverse rods (the one indicated at 7a in the drawing) is mounted in two bearings 11 secured to the vehicle. Projecting from the vehicle beneath the luggage holder are two arms 12, the bent-up end portions 13 of which embrace the other (7b) of the two outermost transverse rods when the luggage holder is in the collapsed position.

The two bars 1 hingedly connected with the transverse rod 7a are provided with two laterally projecting studs 14; two supports 16 and 17 made of tubes and formed in the shape of an acute-angled triangle can be hooked at one end on to these studs, so that the transverse bars can rest on said supports when the luggage holder is in the extended position (Figures 1 and 2). Secured to the other end of the support 16 is a vertical tube 18 which serves as a mounting for the fork 19 of a supporting wheel 20. The other support 17 is hingedly connected with the support 16 by means of a sleeve 21 secured on the tube 18 so that after releasing the supports from the studs 14, the supports can be folded towards one another in order to take up less space.

The luggage holder can also be used without the supports 16 and 17. For this purpose, the transverse rod closest to the outermost transverse rod 7a is allowed to rest on the arms 12 (see Figures 12 and 13) and the luggage holder is pulled out to such an extent that the last-mentioned transverse rod is engaged by the upwardly bent end portions 13 of the arms 12. It is to be noted that both in the fully extended position shown in Figures 1 and 2 and in the partially extended position of the luggage holder shown in Figures 12 and 13, the peculiar articulated connection between the side supports and the transverse rods causes the side supports to be retained in the upwardly hinged position. If the luggage holder is to be moved from the collapsed position to the more or less extended position, the same is initially swung up slightly in the bearings 11 so that the transverse rods can move past the upwardly bent end portions 13 of the arms 12 when pulling out the luggage holder. When using the supports 16 and 17, the luggage holder is fixed in the extended position by the fact that two pins 23 projecting up from the supports 16 and 17 are introduced into holes 24 provided in the transverse rods 7 upon swinging down the luggage holder.

What I claim is:

1. A collapsible luggage holder comprising a pair of parallel side supports each provided by two series of similar bars each pivotally connected at their middle and ends to corresponding portions of others of said bars in the manner of lazy tongs, a plurality of members each providing a straight recess and fixedly connected to an end of one bar of one of said series of bars with said recess extending longitudinally of its connected bar, a plurality of transverse bars for holding the luggage each having each end pivotally connected within the recess of one of said members and with said transverse bars extending substantially perpendicular to said side supports whereby said side supports can pivot onto said transverse bars only when said holder is in its collapsed position.

2. A collapsible luggage holder comprising a pair of side supports each of a lazy-tong structure provided by two series of pivotally connected similar bars with the bars of each series being parallel, two series of studs with each series being fixedly connected to one of said side supports and the studs of both series positioned parallel to one another and extending longitudinally of one of said series of bars with the studs of one series extending towards the studs of the other series, and a plurality of parallel transverse bars for supporting the luggage each having each end pivotally connected to one of said studs whereby said side supports can pivot onto said transverse bars.

3. A collapsible luggage holder comprising a series of transverse parallel bars for supporting the luggage, a pair of extensible parallel side supports each provided by pivotally connected bars in a lazy tong manner, means pivotally connecting said supports each to an opposite end of said bars, a pair of lugs each extending from an end portion of one of said supports, a wheeled frame for supporting said transverse bars, means for detachably connecting said bars to said frame when said holder is in an extended position, and hooks provided on an end portion of said frame for detachably engaging said lugs and retaining said side supports in their extended position.

References Cited in the file of this patent

UNITED STATES PATENTS

| | | |
|---|---|---|
| 416,750 | Rousseau | Dec. 10, 1889 |
| 995,566 | Rasmussen | June 20, 1911 |
| 1,576,104 | Ferguson | Mar. 9, 1926 |
| 1,671,367 | Hoag | May 29, 1928 |